United States Patent
Aström

(10) Patent No.: US 7,669,886 B2
(45) Date of Patent: Mar. 2, 2010

(54) AIRBAG MODULE FOR PROTECTION OF A VEHICLE OCCUPANT

(75) Inventor: Anders Aström, Alingsas (SE)

(73) Assignee: Autoliv Development AB, Vargarda (SE)

( * ) Notice: Subject to any disclaimer, the term of this patent is extended or adjusted under 35 U.S.C. 154(b) by 73 days.

(21) Appl. No.: 11/659,711

(22) PCT Filed: Aug. 3, 2005

(86) PCT No.: PCT/EP2005/008399

§ 371 (c)(1),
(2), (4) Date: Feb. 6, 2008

(87) PCT Pub. No.: WO2006/015779

PCT Pub. Date: Feb. 16, 2006

(65) Prior Publication Data

US 2008/0238059 A1    Oct. 2, 2008

(30) Foreign Application Priority Data

Aug. 7, 2004   (DE) .................. 10 2004 038 459

(51) Int. Cl.
*B60R 21/26* (2006.01)

(52) U.S. Cl. .................................... 280/729; 280/740
(58) Field of Classification Search ................ 280/740, 280/741, 736, 730.2, 743.1, 729
See application file for complete search history.

(56) References Cited

U.S. PATENT DOCUMENTS

| 4,944,527 | A  | * | 7/1990  | Bishop et al.   | ............... | 280/741   |
| 4,966,388 | A  |   | 10/1990 | Warner et al.   |                 |           |
| 5,918,898 | A  | * | 7/1999  | Wallner et al.  | ...........     | 280/728.2 |
| 6,419,266 | B1 |   | 7/2002  | Morfouace       |                 |           |
| 7,370,884 | B2 | * | 5/2008  | Clark et al.    | .................| 280/740   |
| 2002/0033590 | A1 | * | 3/2002 | Adkisson       | .................| 280/728.3 |
| 2003/0094799 | A1 | * | 5/2003 | Smith          | ........................| 280/740 |

* cited by examiner

*Primary Examiner*—Faye M. Fleming
(74) *Attorney, Agent, or Firm*—Brinks Hofer Gilson & Lione

(57) ABSTRACT

An airbag module for protecting a vehicle occupant is provided. The airbag module comprises at least one airbag. A gas generator is in fluid communication with the airbag to inflate the airbag with a gas. A deformable ribbon interfaces with the fluid communication between the gas generator and the airbag. The deformable ribbon has a spiral form with a first radial end covering a second radial end when the gas generator is deactivated.

15 Claims, 3 Drawing Sheets

AIRBAG MODULE FOR PROTECTION OF A VEHICLE OCCUPANT

CROSS REFERENCE TO RELATED APPLICATIONS

This application claims priority to PCT patent application WO 2006/015779 filed Feb. 16, 2006 and DE patent application 102004038459.2 filed Aug. 7, 2004.

FIELD OF THE INVENTION

The present invention relates to an airbag module for protection of a vehicle occupant.

BACKGROUND OF THE INVENTION

Safety systems are known which are intended to protect a person sitting in a motor vehicle in the case of a sudden deceleration of the travel movement, as the person sitting in the vehicle is flung contrary to the deceleration movement against a base located in the vehicle, for example the instrument panel, the front seat, the side wall etc. This event can lead to serious injuries of the vehicle occupant(s).

Such safety systems particularly include safety belts and airbag devices. An airbag device, as is known, comprises an inflatable airbag, which is accommodated for example, in the steering wheel hub cover, the instrument panel and/or the side interior wall of the motor vehicle. In case of collision of the vehicle against an object, an acceleration sensor activates a gas generator, which is ignited within an extremely short time and inflates the airbag with filling gas. For this purpose, the cover or the cladding tears open at a defined point and frees the path for the airbag which is filling with gas. The affected person then sinks into the airbag, which considerably decreases the load which occurs during the sudden deceleration of the vehicle movement.

An airbag device is known from U.S. Pat. No. 4,966,388 in which an airbag is accommodated in a side door to the side of a vehicle occupant, whereby the airbag is inflated by a gas generator when a side collision occurs, so that the inflated airbag takes up a space between the side door of the vehicle and the vehicle occupant. A disadvantage of airbag system of this general type is that the gas which is issuing from the gas generator is very hot, which means that it could possibly damage or burn the airbag and/or injure the vehicle occupant(s).

A flame protection device is known from U.S. Pat. No. 6,419,266, in which the airbag is folded together proximate the gas generator. The device also includes a deflector for accommodation and deflection of the hot gases from the gas generator. This deflector consists of a single expandable metal ribbon, which is located between the gas generator and the airbag. This metal ribbon exhibits a tubular form with a closed circumferential jacket. When the gas generator is activated, the gas is transported into the airbag after it has passed the deflector through side openings in said deflector. The metal ribbon of the deflector is folded together in several layers before activation of the gas generator making it difficult to mount. In addition, its tubular form means that it is more complicated and more expensive to manufacture.

The present invention seeks an airbag module for a vehicle which may offer advantages over the prior art.

SUMMARY OF THE INVENTION

The invention is based on the task of creating an airbag module of the type named at the beginning which is as far as possible non-inflammable and which is also easy and inexpensive to manufacture and mount.

The invention is based on the recognition that the heat which occurs when the gas suddenly leaves the gas generator may damage the airbag and possibly injure the vehicle occupant and therefore the heat which is generated has to be effectively captured before it reaches the airbag.

The task may be resolved by means of an airbag module in which the expandable gas deflection device is designed in the form of a deformable ribbon, which exhibits a spiral form in cross section, whereby the radial ends of the ribbon cover each other when the gas generator is deactivated.

Accordingly, the deformable ribbon does not have a closed tubular form, as the free longitudinal edges of the ribbon overlap. This means that the ribbon which serves as a deflector for the gas which emerges from the gas generator can be manufactured and mounted more easily. The spiral form can also be implemented by means of two cylinder segments which overlap one another.

In at least one embodiment, the deformable ribbon surrounds the gas generator placed in the airbag, if the airbag module or the gas generator are in non-activated state, so that the free longitudinal edges, cover the radial ends of the ribbon (see FIG. 2).

Furthermore, the deformable ribbon is formed in such a way that when the gas generator is activated, the issuing gas unfolds the spiral form of the deformable ribbon, blowing up the airbag, where the spiral form may lie against the inner walls of the airbag under the pressure of the gas. This means that the free longitudinal edges of the deformable ribbon move away from the gas generator and towards the airbag, whereby the diameter of the spiral form is increased.

The deformable ribbon is preferably made of a flexible and heat resistant plastic or metal material, which absorbs a part of the heat and energy from the hot gas, which initially strikes the ribbon when the gas generator is ignited. Extremely hot gas is partially cooled before being conveyed into the airbag to be inflated. This means that damage to the airbag and risk of injury to the vehicle occupants to be protected, in particular by the effects of heat, may be avoided.

In at least one other embodiment, another airbag may be located between the deformable ribbon and the airbag, which is in fluid communication with the outer airbag and the gas generator. In this embodiment, the deformable ribbon opens until it lies against the inner walls of the inner airbag. In this process, further heat energy is absorbed by the inner airbag, and the effect of the heat of the gas is reduced immediately following exit from the gas generator.

Furthermore, when the gas generator is activated, the circumference of the deformable ribbon is limited by its own dimensions and/or by the walls of the surrounding airbag.

Although the radial ends of the spiral-shaped ribbon are open for the exit of the gas, in at least another embodiment, the deformable ribbon exhibits at least one gas outflow opening on its circumference. This may be particularly useful if a further inner airbag is not present, such as in the case of so-called curtain-type window airbags, in which the gas is intended to exit into the airbag rapidly and over as large and area as possible.

Alternatively, this may, for example, be useful for a window airbag which may exhibit at least one seam directed towards the circumference of the deformable ribbon. This then serves as a defined limitation of the expansion of the deformable ribbon following activation of the gas generator.

Finally it is provided that the gas generator, the airbag or the airbags and the deformable ribbon are fixedly connected to each other about at least one point. The airbag module itself may be, for example, fixed to a roof or window rail, within a steering wheel bowl or the instrument panel of the motor vehicle.

BRIEF DESCRIPTION OF THE DRAWINGS

In the following text, the invention will be described in more detail in several embodiments, using the attached drawings.

The drawings are as follows.

DETAILED DESCRIPTION

Figure 1:
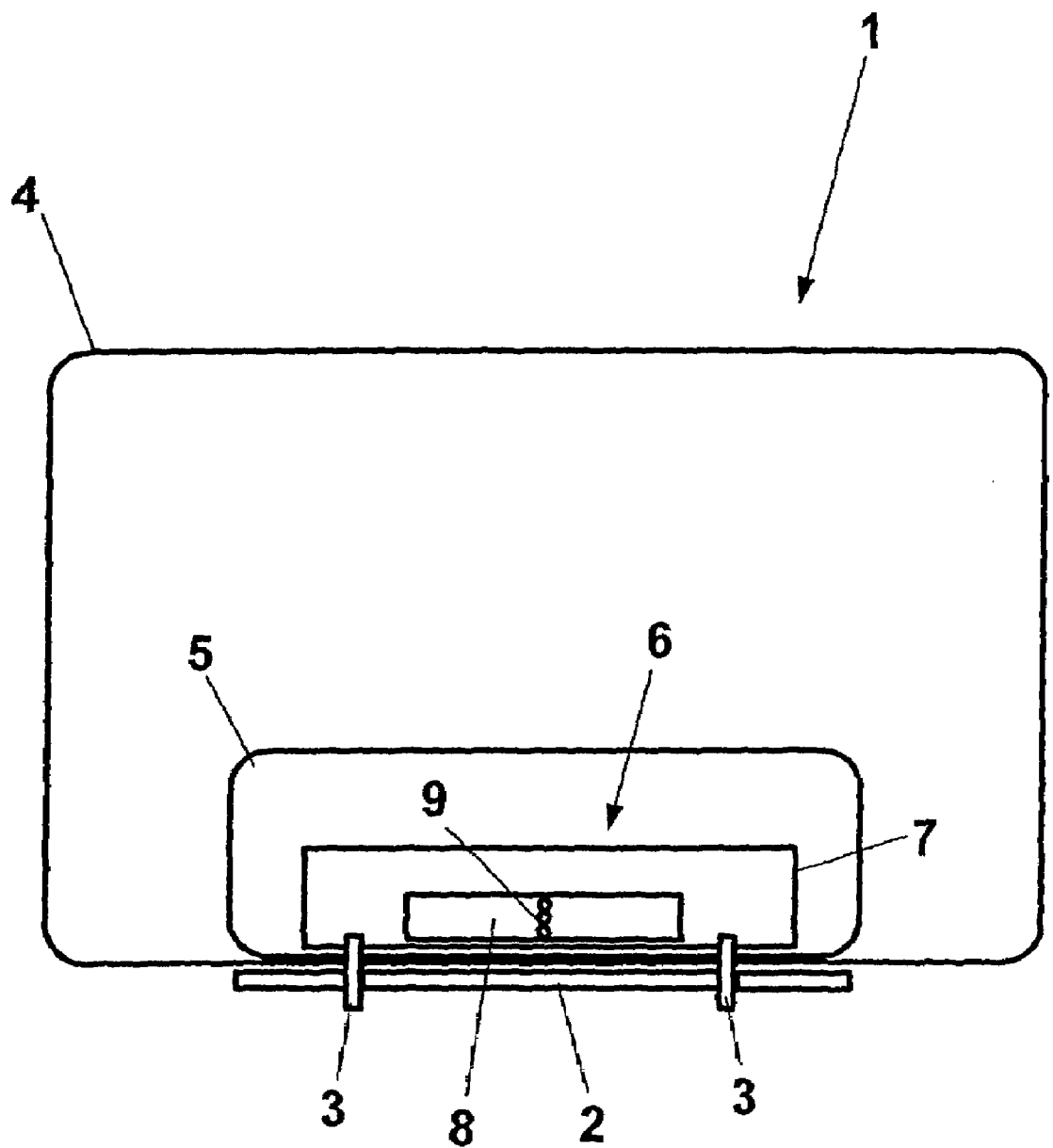
FIG. 1 a schematic side view of the airbag module according to the invention, arranged in a motor vehicle, in a first embodiment with an outer and an inner airbag.

The airbag module 1 shown in FIG. 1 is fixed to a base, such as for example, a side window rail 2 of a motor vehicle, using known fixing elements, such as bolts and/or screws. Furthermore, airbag module 1 comprises an outer airbag 4 and a smaller inner airbag 5 placed inside this, made of textile material. Inner airbag 5 surrounds an expandable gas deflector device 6, which is designed in the form of a deformable ribbon 7 or baffle. Gas deflector device 6, for its part, winds round a gas generator 8, which exhibits a large number of gas exit openings 9 distributed on the circumference.

Deformable ribbon 7 consists of a flexible and heat-resistant plastic or metal material. Deformable ribbon 7 has a spiral form such as is shown in cross sectional view FIG. 2, whereby the radial ends of ribbon 7 cover each other radially and axially when gas generator 8 is in deactivated state.

Figure 2:
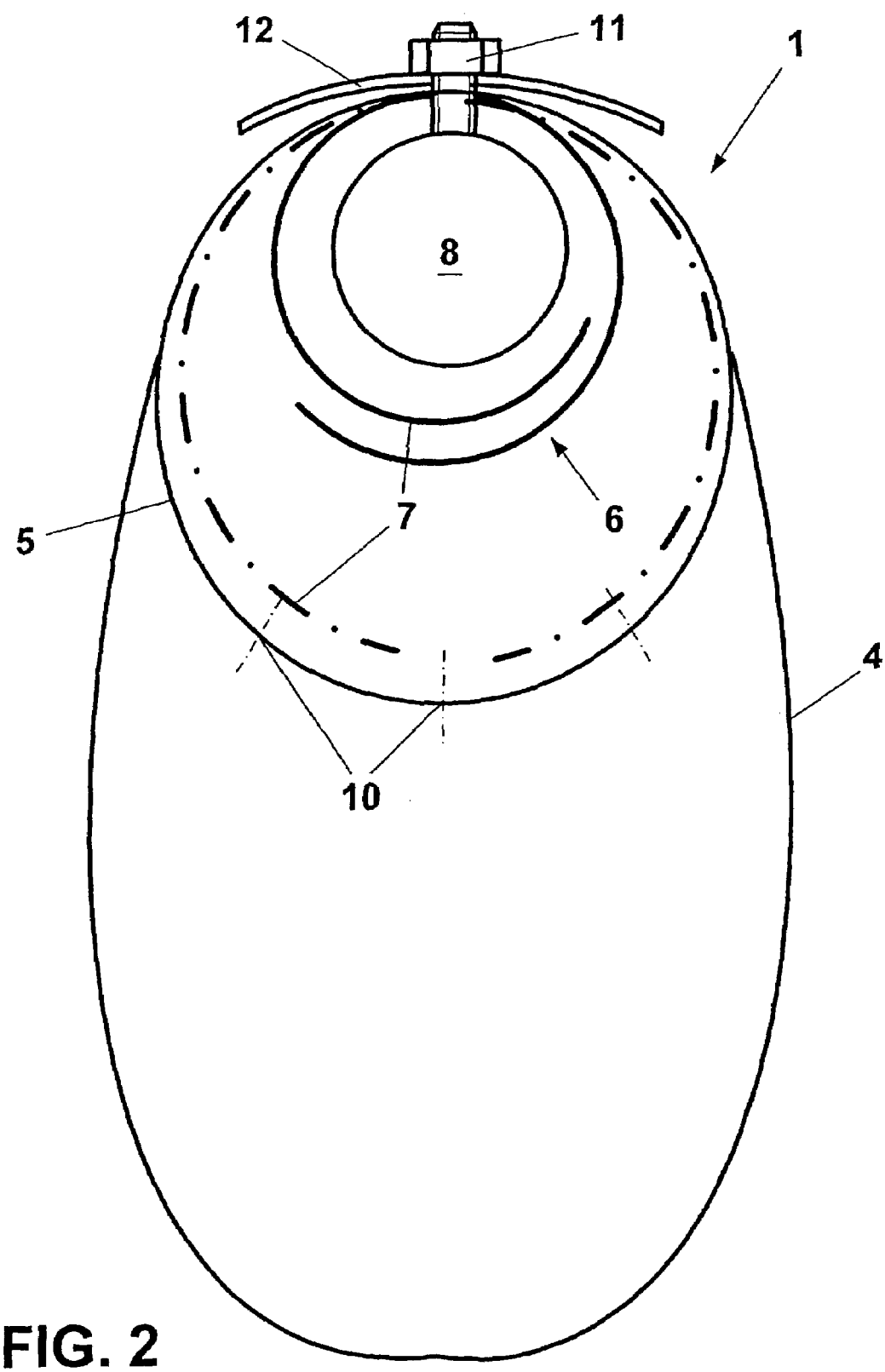
FIG. 2 a cross-section view of the airbag module according to FIG. 1.

On activation of gas generator 8, the issuing gas unfolds the spiral form of deformable ribbon 7 and, under the pressure of the gas, generally takes on the form and position shown by the dash-dot-dash line illustrated in FIG. 2. At the same time, the gas also flows out via the radial ends of ribbon 7. In this process, unfolded ribbon 7 comes to lie against the inner wall of inner airbag 5, now suddenly inflating.

The circumference of deformable ribbon 7 is therefore limited by the walls of the surrounding inner airbag 5. If inner airbag 5 exhibits a larger volume, the enlarging circumference of deformable ribbon 7 is itself limited by its expansion. The gas, which is still under pressure, continues to enter the interior of outer airbag 4 through flow openings 10 inserted in inner airbag 5, which is shown in schematic form in FIG. 2, and thus expands the outer airbag 4 suddenly.

As can also be seen from FIG. 2, gas generator 8, inner airbag 5, and if the outer airbag 4 is not connected to the inner airbag 5, then also outer airbag 4, as well as deformable ribbon 7 are connected to each other in fixed fashion at a central point, for example, by means of a screw connection 11. If appropriate, a support 12 is provided for stabilizing the connection. In the simplest case, this arrangement is fixed in the container of this airbag device.

Figure 3:
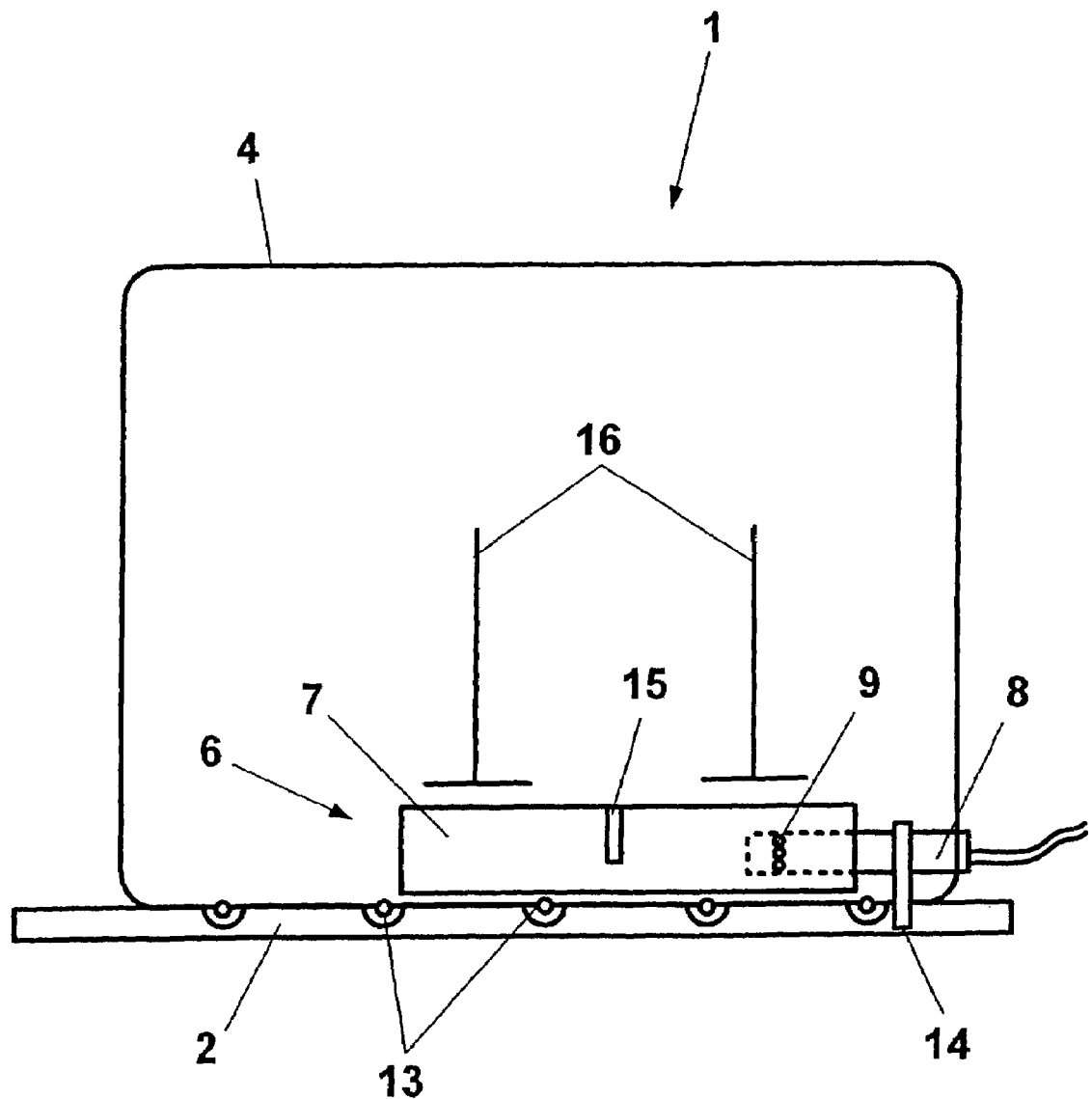
FIG. 3 a schematic side view of the airbag module in a second embodiment with only one airbag.

In the case of the embodiment according to FIG. 3, only one airbag 4 is present, which here is in the form of a side airbag. Airbag 4 and gas generator 8 are connected with the container (not shown) of the airbag device by means of screw fixing 13 and a fixing clip 14, which is fixed to the side window rail 2 of the motor vehicle, or is connected directly with side window rail 2. If the device is in the form of a window airbag, the fixing of airbag 4 and of the gas generator 8 would be implemented on the roof frame of the vehicle.

Gas generator 8 is wound round at least in part by deformable ribbon 7, in fact in a similar way as shown in FIG. 2 and described above. On the circumference side, ribbon 7 possesses at least one gas outflow opening 15 for further direction of the gas streaming off from gas generator 8 into airbag 4.

Airbag 4 may include, for example, two T-shaped seams 16 at a distance to one another. When spiral-shaped ribbon 7 unfolds, its circumference expands to the extent that it reaches T-shaped seams 16. Then the gas which continues to flow out at the radial ends and at gas outflow opening 15 from gas generator 8 ensures complete inflation of airbag 4.

According to the embodiment illustrated in FIG. 1, gas generator 8 can be located inside the space which is created by spiral-shaped ribbon 7. According to the embodiment shown in FIG. 3, this gas generator can be located in part inside this space. However, a third embodiment is also possible, according to which gas generator 8 is completely outside ribbon 7 and the airbag. In this case, the gas generator 8 is provided with a connection piece or is connected with a gas lance, which directs the gas from the gas generator 8 into the inside space formed by spiral-shaped ribbon 7.

As a person skilled in the art will appreciate, the above description is meant as an illustration of implementation of the principles of this invention. This description is not intended to limit the scope or application of this invention in that the invention is susceptible to modification, variation and change, without departing from the spirit of this invention, as defined in the following claims.

The invention claimed is:

1. An airbag module for protection of a vehicle occupant, the airbag module comprising:
    at least one airbag;
    a gas generator that is in fluid communication with the airbag to inflate the airbag with a gas; and
    a deformable ribbon interfacing with the fluid communication between the gas generator and the airbag, wherein the deformable ribbon has a spiral form with a first radial end covering a second radial end when the gas generator is in a deactivated state and an unfold form with the first and second radial ends extending outwardly in correspondingly different directions when the gas generator is in an activated state, and wherein the airbag includes at least one seam that is disposed towards the deformable ribbon and which is cooperatively configured with the airbag such that during the activated state of the gas generator the deformable ribbon circumferencely expands to the seam which limits further unfolding of the deformable ribbon.

2. The airbag module according to claim 1 wherein both the gas generator and the deformable ribbon are disposed within the airbag, and the deformable ribbon surrounds the gas generator.

3. The airbag module according to claim 2 wherein the deformable ribbon is configured to unfold the spiral form to lie against inner walls of the airbag when the gas generator is activated and the gas flows out under pressure.

4. The airbag module according to claim 1 wherein the deformable ribbon is a flexible plastic or metal material.

5. An airbag module for protection of a vehicle occupant, the airbag module comprising:
    at least two airbags including a first airbag and a second airbag that is disposed in the first airbag;
    a gas generator that is in fluid communication with the airbags to inflate the airbags with a gas; and
    a deformable ribbon interfacing with the fluid communication between the gas generator and the airbags, wherein the second airbag is disposed between the deformable ribbon and the first airbag, and is in fluid communication with the first airbag and gas generator, wherein the deformable ribbon has a spiral form with a first radial end covering a second radial end when the gas generator is in a deactivated state and an unfold form with the first and second radial ends extending outwardly in correspondingly different directions when the gas generator is in an activated state, and wherein both the gas generator and the deformable ribbon are disposed within the airbags, and the deformable ribbon surrounds the gas generator.

6. The airbag module according to claim 3 wherein when the gas generator is activated unfolding of the deformable ribbon is circumferencely limited by both the inner walls of the airbag and the seam.

7. The airbag module according to claim 1 wherein the deformable ribbon defines at least one gas exit opening.

8. The airbag module according to claim 1 wherein the gas generator, the airbag and the deformable ribbon are fixedly connected together about at least one point.

9. The airbag module according to claim 1 wherein the deformable ribbon includes two cylinder segments which circumferencely overlap.

10. The airbag module according to claim 5 wherein the deformable ribbon is configured to unfold the spiral form to lie against inner walls of the second airbag when the gas generator is activated and the gas flows out under pressure.

11. The airbag module according to claim 10 wherein when the gas generator is activated unfolding of the deformable ribbon is circumferencely limited by the inner walls of the second airbag.

12. The airbag module according to claim 5 wherein the deformable ribbon is a flexible plastic or metal material.

13. The airbag module according to claim 5 wherein the deformable ribbon defines at least one gas exit opening.

14. The airbag module according to claim 5 wherein the gas generator, the airbag and the deformable ribbon are fixedly connected together about at least one point.

15. The airbag module according to claim 5 wherein the deformable ribbon includes two cylinder segments which circumferencely overlap.

* * * * *